Dec. 23, 1969   I. GROSSBERG   3,485,072
PRESS CONTROL SYSTEM
Filed Jan. 15, 1968

INVENTOR
IMRE GROSSBERG

BY Cullen, Sloman, & Cantor

ATTORNEYS

United States Patent Office 3,485,072
Patented Dec. 23, 1969

3,485,072
PRESS CONTROL SYSTEM
Imre Grossberg, Detroit, Mich.
(2610 Highland Road, Sharon, Pa. 16146)
Filed Jan. 15, 1968, Ser. No. 697,964
Int. Cl. B30b 15/26
U.S. Cl. 72—30                                2 Claims

ABSTRACT OF THE DISCLOSURE

An electrical control system for operating a press, comprising an electrical power source connected through normally open start button switches to a two-pole relay which, when actuated, shunts current around the start button switches through one of the poles of the relay to continue activation of the relay coil, despite release of the start buttons, until a deactivating limit switch is operated, and delivers current through the other relay pole to a solenoid which controls a mechanism for operating the press until press movement opens the limit switch.

BACKGROUND OF THE INVENTION

Conventional presses used for stamping sheet metal, forging operations, and the like, usually include a movable upper press member or platten which is intermittently connected to a constantly running flywheel for movement of the platten downwardly against a base or anvil for thereby pressing a workpiece. Various types of mechanical and fluid operating means have been employed in the past for coupling the flywheel to the movable press member for the short period of time during which the press is to be moved.

In such operations, it is important that the press be operated only during certain specified periods which are operator controlled and that the press discontinue operating after opening of the press members following pressing of the workpiece, with the disconnection of the flywheel from the press operating mechanism occurring automatically. The prior are mechanisms for controlling this operation have been relatively expensive and complicated in construction, requiring many parts, and thus requiring constant maintenance and service in order to insure proper operation and to avoid accidental closing of the press, such as when the operator's hands are within the press area.

SUMMARY OF INVENTION

Hence, it is an object of this invention to provide a highly simplified electrically operated press control, comprising only a relatively few inexpensive parts which need little if any maintenance and which serve to actuate the press mechanism under manual control and to automatically shut off the press mechanism upon completion of a press cycle.

The invention contemplates an electrical circuit for operating a valve which in turn controls the flow of fluid, such as compressed air, to the clutch operating mechanism which engages the flywheel to the drive mechanism of the press, with the electrical circuit comprising a simple arrangement of a power source connected to a double pole relay through manual start buttons, which when released, are by-passed by one of the relay poles to shunt current to maintain the relay coil in activation, with the second pole of the relay functioning to conduct current from the power source to a solenoid which in turn is mechanically connected to the valve for operation of the valve and with the entire circuit being automatically deactivated upon opening of a simple limit switch which may be positioned upon the press and operated when the press reaches a certain predetermined point in its cycle.

These and other objects and advantages of this invention will become apparent upon reading the following description, of which the attached drawings form a part.

DETAILED DESCRIPTION

Figure 2:
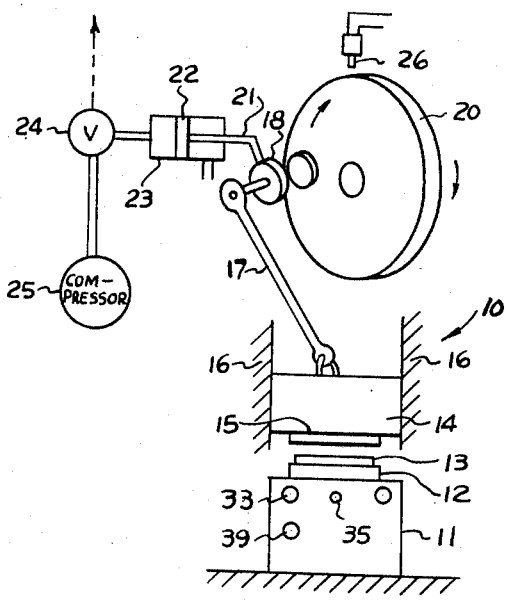
FIG. 2 is a simplified, schematic view of a typical press and its drive and actuating mechanism.

FIG. 2 illustrates, in a highly schematic and simplified form, a typical press 10, used for stamping or forging metal parts. The basic elements of the press include a base or anvil portion 11 upon which a lower die half 12 is mounted for receipt of the metal workpiece 13. The press includes a movable member or platten 14 upon which the upper die half 15 is mounted. Movement of the upper press member 14 between supporting guides 16 result in applying pressure against the workpiece for stamping, forging or the like.

The drive mechanism for this press is schematically shown as including a drive-rod 17 whose lower end is connected to the upper, movable press member and whose lower end is arranged to be coupled through a suitable clutch 18 to a constantly rotating flywheel 20 which may be powered by a suitable motor. Thus, by actuating the coupling or clutch 18, the drive rod 17 is momentarily connected to the constantly rotating flywheel 20 to thereby move the upper press member down into operating position and then back up again, at which point it is uncoupled or declutched until the workpiece is removed and a fresh workpiece is replaced.

In the example shown in FIG. 2, the clutch is operated by means of a mechanical lever 21 connected to a piston 22 arranged within a pneumatic cylinder 23 which in turn is connected to a compressor or source of compressed air 25 through an on-off valve 24. The typical operation of such a press is that when the valve 24 is open, compressed air moves the piston 22 in turn moving the lever 21 to close the clutch 18 to thereby couple the drive rod 17 to the constantly moving flywheel 20 and cause the press member to move down into press position and then back up again, at which point a limit switch 26 is actuated, in turn deactivating or closing the valve 24 to maintain the movable press member in its up position until the machine is unloaded and then reloaded.

Figure 1:
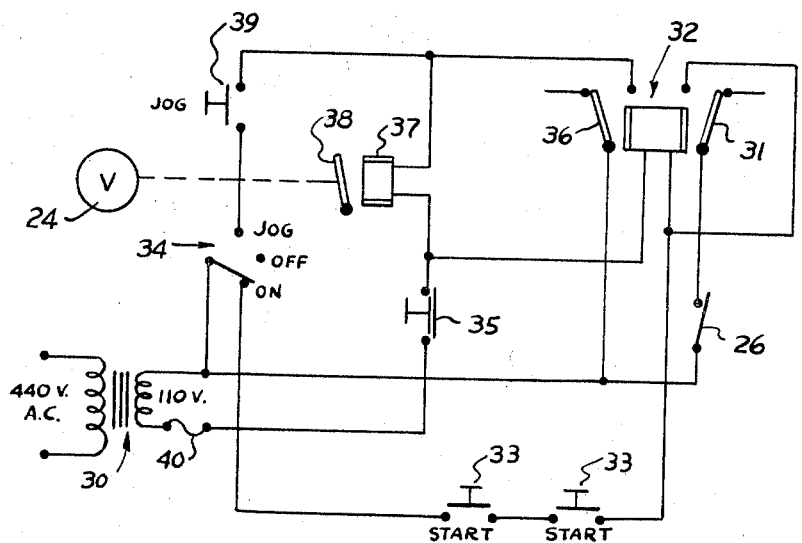
FIG. 1 is a schematic view of the electrical control circuit herein.

The control circuit, which relates to the invention herein, is schematically illustrated in FIG. 1. Such circuit includes a power input transformer 30 which receives the line current, such as for example 440 volts AC and reduces it to the more conventionally useful house current of 110 volts.

One side of the secondary coil is connected through the limit switch 26 to one blade 31 of a double-bladed relay 32, shown in open position in FIG. 1. The relay coil in turn is connected to a pair of series arranged push button switches 33, one for left hand and one for right hand operation, as is conventional on a press, and then through a three-position control switch 34 back to the same side of the secondary coil of the transformer 30.

The opposite side of the secondary coil of the transformer is connected through a normally closed pushbutton stop switch 35 to first, the opposite side of the relay coil 32 and also through a solenoid coil 37 having a lever 38, which when actuated operates to open the valve 24.

The opposite side of the solenoid coil is connected through the second blade 36 (shown in open position in FIG. 1) of the relay back to the power transformer.

The three-way switch 34 is provided with an on position, an off or disconnect position and a jog or manually operated position, which in turn is wired to a push-button jog switch 39 connected to the solenoid coil 37 so that manual closing of the switch 39 will cause the press to operate and by-pass the remainder of the circuit. This jog button functions to manually operate the press for maintenance and checking purposes.

In addition, a suitable fuse 40 is also provided in the circuit to avoid damage to the elements in case of overload.

OPERATION

In operation, the press is first loaded with a fresh workpiece 13 and thereafter, the operator places his left and right hand on each of the two start buttons 33 and upon closing these, current flows to the relay coil 32. This in turn causes the two relay blades 31 and 36 to close. The operator now releases the start buttons which causes current to continue to flow through the blade 31 to continue actuating the relay coil 32.

Meanwhile, current flows through the second relay blade 36 to the solenoid coil 37, whose lever 38 moves to hereby open the valve 24, in turn permitting fluid to enter the cylinder 23 (see FIG. 2) to move the piston 22 and lever 21 to thereby close the clutch 18. At this point, the drive rod 17 is connected to the constantly rotating flywheel 20 to thereby move the press into its closed position. As the flywheel rotates, the press continues back to its upward position at which point a suitable projection or contact point on either the flywheel 20 or the press member 14 or some other convenient place actuates the limit switch 26 which, in opening, blocks the flow of current through the relay blade 31, causing the relay coil 32 to deactivate and thereby deactivate the entire circuit.

At this point, the lever 38 moves to its open position automatcally, in turn shutting off the valve 24 which disconnects the clutch 18 and the drive rod 17 from the flywheel so that the flywheel may now continue rotating without affecting the press itself.

Should it be desired to manually move the press through a complete cycle or part of the cycle, such as for maintenance or for test purposes, the switch 34 is placed into the jog position and then the manual jog button 39 is depressed so that the press will move for as long as the button remains closed.

With this construction, the number and cost of the control elements has been substantially reduced and maintenance problems have been almost completely eliminated.

This invention may be further developed within the the scope of the following claims. Accordingly, it is desired that the foregoing description be read as being merely illustrative of an operative embodiment of this invention and not in a strictly limited sense.

Having fully described an operative embodiment of this invention, I now claim:

1. A control system for controlling movement of a press, comprising:
   an electrical power source connected in series with at least one normally open start switch, a relay coil and a normally closed stop switch;
   said relay having two normally open blades with one of said blades connected to one side of the relay coil, when the relay is actuated and through a normally closed limit switch to one side of the power source for shunting current to the relay coil after first closing the start switch to activate the coil and then releasing the start switch to open it;
   the second relay blade being connected to said one side of the power source and, when the coil is actuated, to a solenoid coil connected through the stop switch to the opposite side of the power source;
   whereby closing the start switch activates the relay coil, to close its blades, thereby causing current to flow to the relay coil after the start switch is again opened until the limit switch is opened to thereby deactivate the control system;
   and said solenoid, when activated, operating a press mechanism for actuating the press for a predetermined time until the limit switch is opened;
   a three position switch arranged in series between the power source and the start switch, and having an on position, an off-open position and a manual control position connected in series to a manually operated normally opened control switch and between the solenoid relay and said second blade, whereby the solenoid is activated for as long as the manually operated control switch is held manually closed.

2. A construction as defined in claim 1, and said press mechanism including a valve operated by said solenoid to in turn connect a drive mechanism to a movable member of the press for thereby moving said movable member to close the press and open it again until a predeterined point where the limit switch is opened by the press movement.

References Cited

UNITED STATES PATENTS

| | | | |
|---|---|---|---|
| 2,457,992 | 1/1949 | Fischer | 72—20 |
| 3,168,918 | 2/1965 | Smith | 72—20 |

CHARLES W. LANHAM, Primary Examiner

G. P. CROSBY, Assistant Examiner